United States Patent
White

(10) Patent No.: US 12,242,364 B2
(45) Date of Patent: Mar. 4, 2025

(54) ENGAGEMENT-BASED COMMUNICATION SESSION MANAGEMENT

(71) Applicant: Microsoft Technology Licensing, LLC, Redmond, WA (US)

(72) Inventor: Ryen W. White, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 46 days.

(21) Appl. No.: 17/673,401

(22) Filed: Feb. 16, 2022

(65) Prior Publication Data

US 2023/0259437 A1  Aug. 17, 2023

(51) Int. Cl.
| | | |
|---|---|---|
| *G06F 11/30* | (2006.01) | |
| *G06F 3/16* | (2006.01) | |
| *G06F 18/214* | (2023.01) | |
| *G06N 20/00* | (2019.01) | |

(52) U.S. Cl.
CPC .......... *G06F 11/3041* (2013.01); *G06F 3/165* (2013.01); *G06F 11/3096* (2013.01); *G06F 18/214* (2023.01); *G06F 2201/805* (2013.01); *G06F 2201/86* (2013.01); *G06N 20/00* (2019.01)

(58) Field of Classification Search
CPC .. G06F 3/165; G06F 11/3096; G06F 11/3041; H04N 7/15
See application file for complete search history.

(56) References Cited

U.S. PATENT DOCUMENTS

| | | |
|---|---|---|
| 8,630,208 B1 | 1/2014 | Kjeldaas |
| 10,412,228 B1 | 9/2019 | Haus et al. |
| 11,082,465 B1 | 8/2021 | Chavez et al. |
| 2020/0020340 A1* | 1/2020 | Sheikh ................. G10L 25/48 |
| 2020/0110572 A1 | 4/2020 | Lenke et al. |
| 2021/0076002 A1 | 3/2021 | Peters et al. |
| 2021/0132897 A1* | 5/2021 | Song ...................... G06F 3/165 |
| 2021/0201935 A1* | 7/2021 | Seethaler ............. H04R 29/004 |
| 2021/0359872 A1* | 11/2021 | Deole .................. H04R 29/004 |
| 2022/0043938 A1* | 2/2022 | Kochura ............. H04L 65/1089 |

(Continued)

OTHER PUBLICATIONS

"International Search Report and Written Opinion Issued in PCT Application No. PCT/US23/010980", Mailed Date: May 3, 2023, 11 Pages.

*Primary Examiner* — Phong H Dang

(57) ABSTRACT

Aspects of the present disclosure relate to engagement-based communication session management. In examples, an interaction intent metric is generated for a user according to a variety of factors relating to the user (e.g., the semantic content and tone of the user's speech, a direction of the user's gaze, and historical user characteristics) and the meeting (e.g., whether the user's name was mentioned by another communication participant or whether another communication participant is soliciting input), among other examples. Accordingly, if a positive interaction intent is identified and the user is currently muted, an action can be recommended to address the mismatch between the positive interaction intent and the muted status of the user. Similarly, if a negative interaction intent is identified and the user is currently unmuted, an action can be performed to address the mismatch between the negative interaction intent and the unmuted status of the user.

20 Claims, 10 Drawing Sheets

(56) References Cited

U.S. PATENT DOCUMENTS

| | | | |
|---|---|---|---|
| 2022/0060525 A1* | 2/2022 | Chavez | G06V 40/176 |
| 2022/0122583 A1* | 4/2022 | Bates | H04L 12/1818 |
| 2022/0308825 A1* | 9/2022 | Tosh | H04N 7/15 |
| 2023/0077283 A1* | 3/2023 | Mehta | H04L 65/1086 |

* cited by examiner

ENGAGEMENT-BASED COMMUNICATION SESSION MANAGEMENT

BACKGROUND

When communicating with other users, a user may inadvertently forget to mute or unmute a video and/or audio, thereby inhibiting the ability of communication participants to engage in effective communication.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to engagement-based communication session management. In examples, an interaction intent metric is generated for a user according to a variety of factors relating to the user (e.g., the semantic content and tone of the user's speech, a direction of the user's gaze, and historical user characteristics) and the meeting (e.g., whether the user's name was mentioned by another communication participant or whether another communication participant is soliciting input), among other examples. Accordingly, if a positive interaction intent is identified and the user is currently muted, an action can be recommended to address the mismatch between the positive interaction intent and the muted status of the user. Similarly, if a negative interaction intent is identified and the user is currently unmuted, an action can be performed to address the mismatch between the negative interaction intent and the unmuted status of the user.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
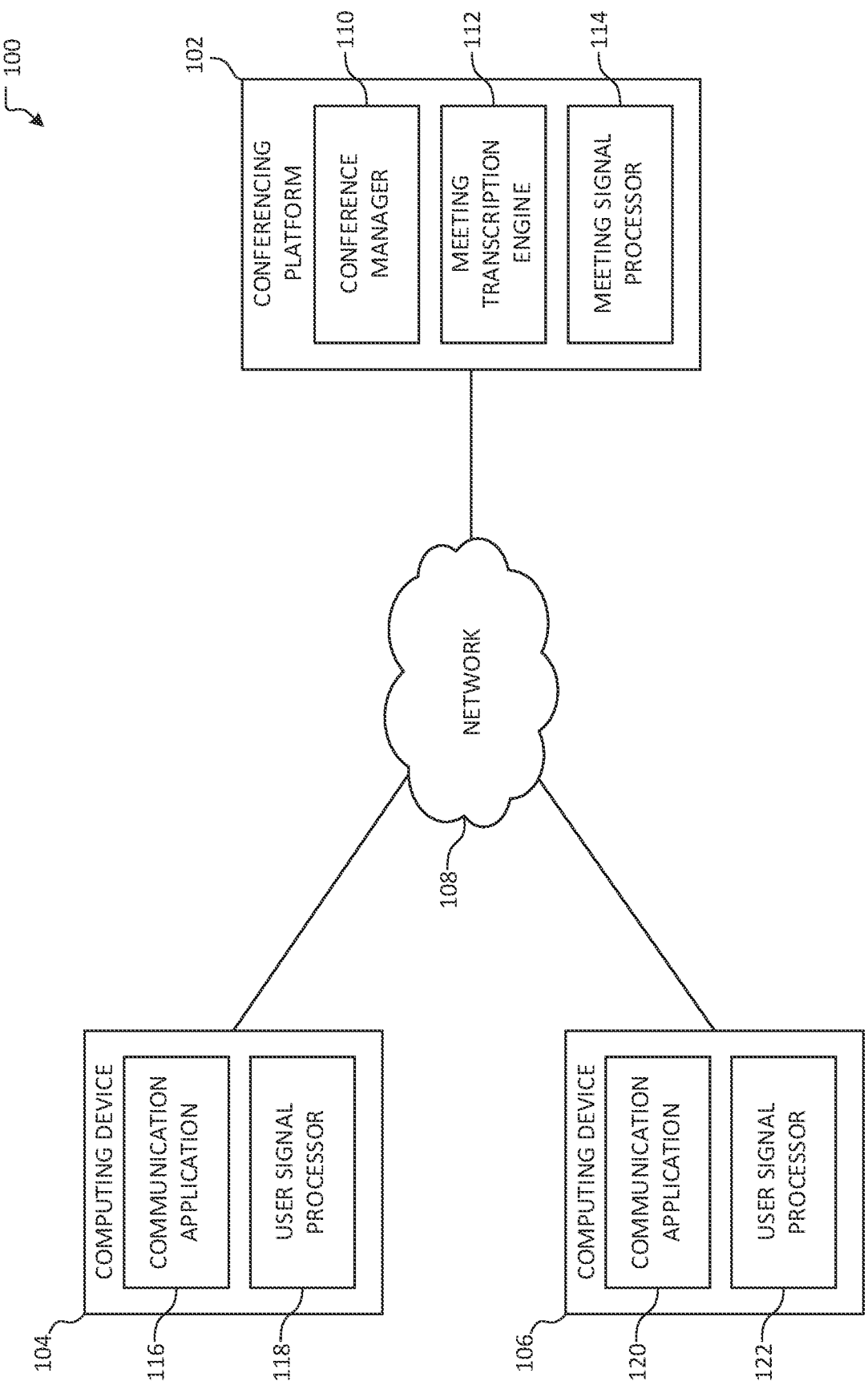
FIG. 1 illustrates an overview of an example system for engagement-based communication session management according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, users communicate with one another as part of a communication session. For example, the communication session may include text, audio, and/or video communication, such as a teleconference, a video conference, or an online meeting, among other examples. In such an example, a user may enable or disable a microphone and/or an image capture device, thereby controlling whether audio and/or video input, respectively, is provided to other communication participants as part of the communication session. However, a user may forget to unmute the microphone when speaking to another communication participant or may forget to mute the microphone when speaking to another individual in the user's environment (e.g., proximate to the user's computing device but not a part of the ongoing communication session). These and other scenarios may inhibit the ability of communication participants to communicate with one another, for example as a result of increased time associated with a user repeating what was said while on mute or as a result of other users being unable to communicate when noise is inadvertently communicated to other communication participants when the user was unmuted.

Accordingly, aspects of the present disclosure relate to engagement-based communication session management. In examples, an interaction intent metric is generated for a user to determine whether the user intends to interact with an ongoing communication session. As another example, it may instead be determined that the user intends to interact with another individual or that identified input is not associated with the ongoing communication session (e.g., as may be the case when the environment of the user is noisy). As a result, if the interaction intent metric is determined to indicate that the user intends to interact with the communication session, an action may be performed when it is determined that a user is muted. For example, a reminder may be provided to the user that the user is currently muted, an indication may be provided to one or more other communication participants (e.g., providing a graphic to indicate the user wishes to communicate or noting that the user intends to communicate in a list of users). In another example, if the interaction intent metric is determined to indicate that the user does not intend to interact with the communication session, an action may be performed when it is determined that the user is not muted. For example, the user may be reminded that the user is muted or the user may automatically be muted so as to reduce the impact of potentially distracting user input on the ongoing communication session.

It will be appreciated that any of a variety of actions may be performed in association with instances where a user is unmuted or muted and that such actions need not be limited to the communication participant for which the interaction intent metric was generated. As noted above, an indication may be presented to another communication participant to indicate that the user intends to communicate as part of an ongoing communication session when the user is on mute but is determined to intend to communicate with the communication participants. As another example, an indication may be presented that enables the other communication participant to mute the user when the user is not on mute and it is determined that the user does not intend to communicate with the communication participants.

Similarly, a graphic may be displayed to indicate that the user intends to communicate (e.g., a raised hand graphic) or the user may be added to a queue of participants that may be waiting to communicate (e.g., as may be visible to a meeting organizer and/or one or more other communication participants). In some instances, the user may be presented with an option to respond with a message as an alternative or in addition to a recommendation to unmute, as may be the case when it is determined that a meeting context is not conducive to participation by the user when the intent to communicate was identified.

In some examples, a set of actions may be determined based on a confidence associated with a determined user intent and/or according to a meeting context, among other examples. For example, certain actions may be presented to a user when a given user intent is determined with a first degree of certainty (e.g., above a first predetermined threshold), while an action may automatically be performed when the user intent is determined with a second degree of certainty (e.g., above a second predetermined threshold that is greater than the first predetermined threshold).

An interaction intent metric may be determined based on a variety of factors, including, but not limited to, factors associated with audio input, video input, a meeting context, and/or historical user characteristics. For example, audio input may be processed to generate semantic factors and/or linguistic factors (e.g., prosodic features, tone, and formality). As another example, video input may be processed to determine a user's head pose and/or whether the user is making eye contact with a device associated with the communication session or one or more other communication participants. Meeting context includes, but is not limited to, whether a user's name has been mentioned, whether a user has provided an indication to raise a hand, text input associated with a communication session (e.g., from a meeting chat or between a subset of users), whether a user has solicited questions or requested user input from the audience, whether the user is the meeting organizer, and/or whether there has been a lull or natural pause in the dialogue among the communication participants.

Historical user characteristics may be determined based on previous user engagement during one or more previous communication sessions. In some instances, the historical user characteristics may be determined for historical communication sessions having the same or a similar set of communication participants, such that user interaction with similar communication participants may be used to predict user behavior in an ongoing communication session. For example, it may be determined whether a user is likely to engage with a set of communication participants and/or a in response to a specific communication participant, whether the user is likely to engage during a question/answer portion of a communication session, and/or whether the user typically engages during previous occurrences of a recurring meeting, among other examples. While examples are described based on previous communication sessions, it will be appreciated that similar techniques may be used to generate or update historical user characteristics based on user behavior identified during a current or ongoing communication session in other examples.

Factors may be generated at a user's computing device or by a conferencing platform, or any combination thereof. For example, factors associated with audio input and video input may be generated at the user's computing device, while a meeting context and a set of historical user characteristics may be maintained by the conferencing platform. In examples, the conferencing platform may generate a transcript associated with a communication session, such that the transcript may be processed to generate at least some of the factors according to aspects described herein. Thus, aspects of the present disclosure may rely on or otherwise utilize processing that may already be performed by the conferencing platform, thereby reducing computational resource utilization associated with providing such functionality.

A machine learning model may be used to process these and/or other factors (e.g., relating to user engagement and/or meeting context) to generate a user intent metric accordingly. For example, a user may provide an opt-in indication, in response to which such factors may be generated and stored as historical factors in association with the user. In some instances, opting in may be user-specific for factors that are specific to a given user (e.g., historical user characteristics and factors associated with audio/video inputs), while other factors may be generated and stored based on an opt-in indication associated with a larger group of communication participants, as may be the case for a meeting context. The historical factors may be annotated, for example automatically based on user actuation of a mute/unmute control and/or manually (e.g., by the user or a third-party may annotate anonymized data) to indicate whether the factor indicates the presence or absence of a user intent to engage with a communication session. The annotated data may be used to train a deep learning model, such that the deep learning model can be used to characterize future features and generate an associated intent metric according to aspects described herein.

Identified audio and/or video input may be processed using to the machine learning model to provide engagement-based communication session management according to aspects of the present disclosure. For example, when input is detected, the input may be processed using a machine learning model as described above, thereby generating an interaction intent metric associated with the input. Input may be processed according to an interval, such that an interaction intent metric is generated at a predetermined or dynamic interval. The generated interaction intent metric may be compared to a positive intent threshold, above which it may be determined that the user intends to interact with a communication session. In another example, the interaction intent metric may be compared to a negative intent threshold, below which it may be determined that the user does not intend to interaction with the communication session.

In examples, when it is determined that the interaction metric exceeds a threshold, a second machine learning model may be used to identify a set of actions associated with the interaction intent metric. As noted above, the determined set of actions may be a subset of available actions, as may vary according to a meeting context, a threshold with which the interaction intent metric is evaluated, and/or a confidence score associated with the interaction intent metric, among other examples. Thus, as a result of aspects of the present disclosure, one or more actions may be performed automatically and/or presented to a user in response to identifying a positive or negative intent to engage with a communication session. It will therefore be appreciated that there may be instances where a user is muted and user input is identified, but a reminder to unmute may not be presented. Rather, it may be determined that, despite the identified input, the user does not intend to engage with the communication session.

Aspects of the present disclosure are applicable in a variety of communication sessions, including, but not limited to, teleconferencing, online meetings, and/or group or team chat in a gaming context. Further, a communication session may be a peer-to-peer communication session (e.g., among a set of participant computing devices) or may include a conferencing platform to which at least a subset of participant computing devices connect. The present techniques may be applied to a variety of modes of communication, including, but not limited to, textual communication, audio communication, video communication, screen sharing, and/or collaborative document editing, among other examples. For instance, in a screen sharing context, it may be determined that a user does not intend to share at least a portion of the user's screen (e.g., as a result of it being unrelated to the meeting context or dissimilar as compared to a user's historical characteristics), such that the portion may be omitted from sharing or screen sharing may be terminated or suspended, among other examples.

FIG. 1 illustrates an overview of an example system 100 for engagement-based communication session management according to aspects described herein. As illustrated, system 100 includes conferencing platform 102, computing device 104, computing device 106, and network 108. In examples, conferencing platform 102, computing device 104, and/or computing device 106 communicate via network 108, which may comprise a local area network, a wireless network, or the Internet, or any combination thereof, among other examples.

Conferencing platform 102 includes conference manager 110, meeting transcription engine 112, and meeting signal processor 114. In examples, conference manager 110 manages a communication session for a set of communication participants. For example, computing device 104 and computing device 106 may each communicate via conferencing platform 102 during a conference session, as may be managed by conference manager 110.

Meeting transcription engine 112 may utilize automated speech recognition to generate a transcript for a communication session. In examples, meeting transcription engine 112 generates the transcript contemporaneously with communication by the communication participants or, as another example, at least a part of the transcript may be generated or updated after the communication session has concluded.

A transcript generated by meeting transcription engine 112 may thus be used as one or more factors from which an interaction intent metric is generated. For instance, meeting signal processor 114 may process a transcript generated by meeting transcription engine 112 to generate such factors according to aspects described herein. In examples, meeting signal processor 114 performs an additional or alternative evaluation of a communication session, for example to perform a semantic or linguistic analysis of the audio of a communication session. In other examples, meeting signal processor 114 may process the video of a communication session, for example to evaluate user engagement.

Thus, in some examples, meeting signal processor 114 may generate annotated training data with which to train a machine learning model according to aspects described herein. For instance, meeting signal processor 114 may generate factors and annotate the generated factors with whether the participant for which the factors were generated was or ultimately did engage in the communications session. As described above, processing by meeting signal processor 114 may be performed in response to an opt-in indication associated with a communication session (e.g., as may be specified as a preference associated with a meeting and/or by each associated communication participant).

Computing device 104 includes communication application 116 and user signal processor 118. In examples, communication application 116 enables a user of computing device 104 to communicate as part of a communication session (e.g., with a user of computing device 106 via communication application 120). As an example, communication application 116 may communicate with communication application 120 via conferencing platform 102 (e.g., using conference manager 110). In other examples, communication application 116 and communication application 120 may communicate more directly via network 108. Thus, it will be appreciated that a communication session need not be implemented using a centralized conferencing platform 102 and may be implemented using any of a variety of alternative or additional techniques.

User signal processor 118 may identify or otherwise generate factors associated with a user, as may be identified based on audio and/or video input (e.g., from an audio and/or video capture device of computing device 104, not pictured). In examples, user signal processor 118 may generate factors associated with a communication session, such that user signal processor 118 may maintain at least a part of a meeting context and/or one or more historical user characteristics. Thus, it will be appreciated that while example factors are described with respect to meeting signal processor 114 and user signal processors 118 and 122, alternative or additional factors may be generated by any of a variety of signal processors and need not be restricted to generation at conferencing platform 102 and computing devices 104 and 106, respectively.

Computing device 106 is illustrated as comprising communication application 120 and user signal processor 122, aspects of which are similar to communication application 116 and user signal processor 118, respectively, of computing device 104, and are therefore not necessarily re-described below in detail.

Accordingly, as a user of computing device 104 and a user of computing device 106 communicate with one another using communication applications 116 and 120, respectively, input received at each respective computing device may be processed according to aspects described herein to identify instances where a user is muted but intends to engage in the communication session and instances where the user is unmuted but does not intend to engage in the communication session. For example, factors (e.g., as may be generated by meeting signal processor 114, user signal processor 118, and user signal processor 122) may be processed according to a machine learning model (e.g., for each user by associated communication application 116 or communication application 120) to generate an intent metric for each user. In examples, the machine learning model is local to each respective computing device, as may be the case when the machine learning model is tuned (e.g., using reinforcement learning) to the specific user of the computing device.

With reference to communication application 116 as an example, communication application 116 may determine to automatically mute a user of computing device 104, to automatically perform any of a variety of other actions, and/or to present a set of actions for selection by the user, among other examples. In some instances, communication application 116 may determine an action associated with another communication participant of a communication session (e.g., a user of computing device 106), such that an indication of the determined action may be provided to computing device 106 (e.g., via conference manager 110 in some examples).

In other examples, conference manager 110 may perform at least a part of the processing discussed above with respect to communication applications 116 and 120, for example to process factors (e.g., as may be obtained from meeting signal processor 114, user signal processor 118, and/or user signal processor 122), such that conference manager 110 may automatically perform an action and/or may provide an indication of a set of actions to communication application 116 and/or communication application 120. As a result, a communication application in receipt of a set of actions may automatically perform one or more actions therein and/or provide an indication of an action, among other examples. In such an example, a machine learning model with which factors are processed may be local to each respective computing device, such that data processing associated with user-related factors is performed local to the computing device rather than by conferencing platform 102. In other examples, at least a part of such processing may be performed by conferencing platform 102, as may be the case when a user has opted in to such cloud-based processing.

Figure 2:
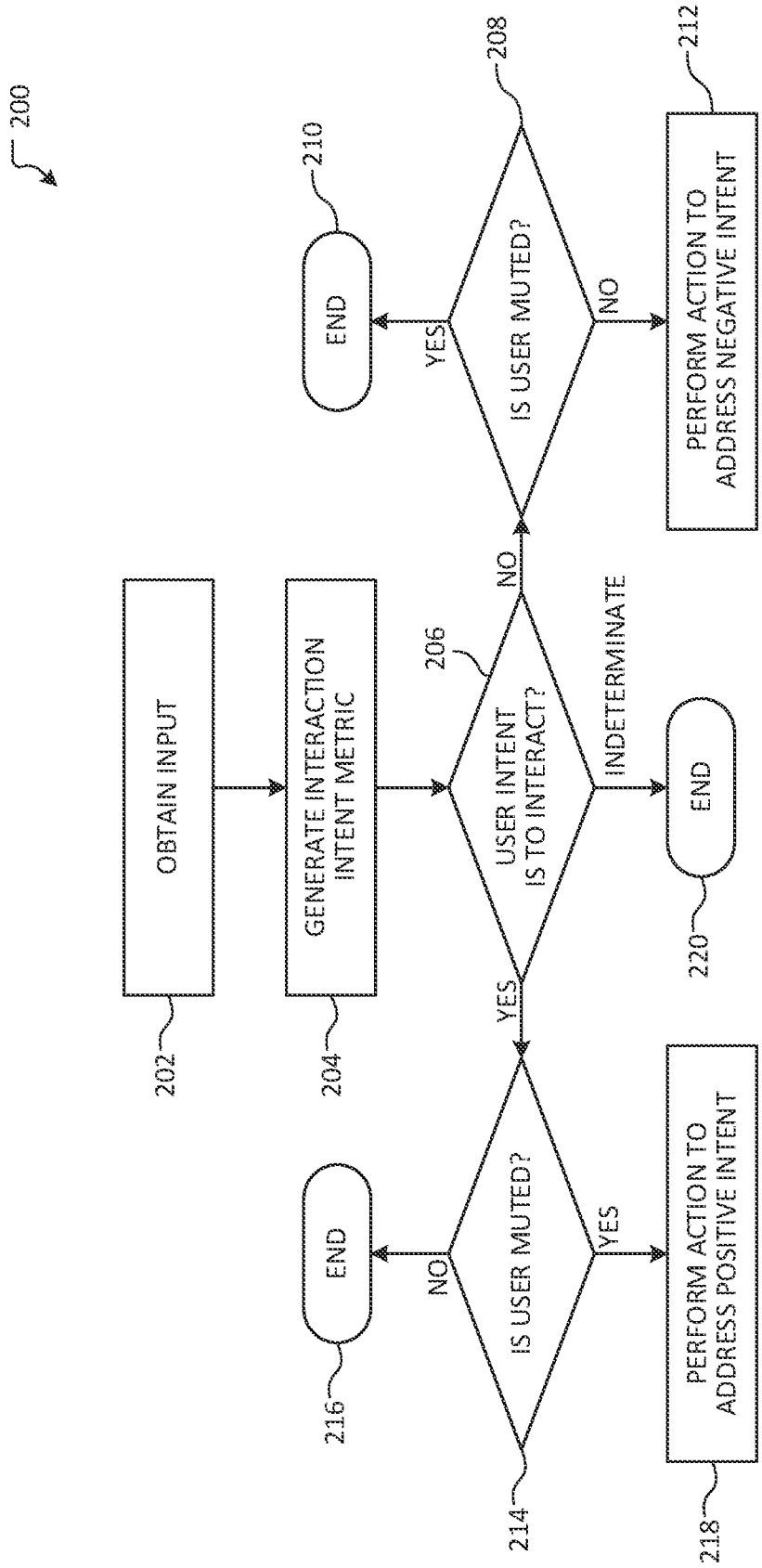
FIG. 2 illustrates an overview of an example method for engagement-based communication session management based on identified user input associated with a user of a computing device.

FIG. 2 illustrates an overview of an example method 200 for engagement-based communication session management based on identified user input associated with a user of a computing device. In examples, aspects of method 200 may be performed by a computing device, such as computing device 104 or computing device 106 discussed above with respect to FIG. 1. Method 200 may be performed in response to the identification of input associated with a computing device or may be performed on an iterative basis (e.g., as may be the case during the receipt of input).

Method 200 begins at operation 202, where input is obtained. For example, the input may be obtained from an audio and/or video input device of a computer and may thus include audio and/or video input associated with an environment in which the computing device is located. In examples, the obtained input includes user interaction with an ongoing communication session or may include noise that is unrelated to the communication session, among other examples.

At operation 204, an interaction intent metric is generated. For example, the interaction intent metric may be generated as a result of processing a set of factors using a machine learning model. As discussed above, the set of factors may be associated with a user and/or the ongoing communication session, among other examples. In examples, the factors are obtained from a user signal processor (e.g., user signal processor 118 or 122) and/or a meeting signal processor (e.g., meeting signal processor 114), among other examples.

The model with which the factors are processed may be selected from a set of models, as may be the case when a model is tuned for a specific context. Example contexts include, but are not limited to, a locale of the computing device, an industry associated with a communication session, and/or a means of communication (e.g., a different model may be used for audio-only communication as compared to an audio/video communication session or a communication session associated with a video game application). As another example, a model may be tuned for a specific user or group of users.

Flow progresses to determination 206, where it is determined whether there is user intent to interact with the communication session. In examples, determination 206 comprises comparing the interaction intent metric that was generated at operation 204 to one or more thresholds or ranges. For example, if it is determined that the interaction intent metric is below a negative intent threshold, it may be determined that the user does not intend to interact with the communication session. Conversely, if it is determined that the interaction intent metric is above a positive intent threshold, it may be determined that the user intends to interact with the communication session. In both instances, the interaction intent metric may be said to "exceed" either the negative intent threshold or the positive intent threshold. Finally, if the interaction intent metric is between the negative intent threshold and the positive intent threshold, it may be determined that the user's intent is indeterminate. In other examples, a confidence score associated with operation 204 may be used as part of the evaluation performed at determination 206, among other examples. In some instances, such thresholds may be specific to a given user and/or may be user-configurable.

While examples are described in the context of a single machine learning and associated positive and negative intent thresholds, it will be appreciated that a variety of other techniques may be used according to aspects described herein. For example, a positive intent model may be used in conjunction with a positive intent threshold, while a negative intent model may be used in conjunction with a negative intent model, such that multiple models are used to generate a set of interaction intent metrics (e.g., at operation 204), each of which may be evaluated according to one or more associated thresholds. The resulting set of interaction intent metrics may similarly be processed at determination 206, for example where a positive intent model interaction metric may be compared to the positive intent threshold and the negative intent model interaction metric may be compared to the negative intent threshold to determine whether the user intent is to interact with the communication session.

Accordingly, if it is determined that the user does not intend to interact with the communication session (e.g., as a result of the interaction intent metric being below the negative intent threshold), flow branches "NO" to determination 208, where it is determined whether the user is muted. In examples, determination 208 specifically evaluates an audio mute and/or a video mute of the user, as may be the case when the obtained input is specifically associated with either an audio input device or a video input device, respectively. In examples, an audio input device and a video input device may each be the same device. For example, if video input is determined to not indicate an intent to interact, a video mute may be evaluated at determination 208. Similarly, if audio input is determined to not indicate an intent to interact, an audio mute may be evaluated. If it is determined that the user is muted, flow branches "YES" and terminates at operation 210, as the unrelated input will not be provided as part of the communication session as a result of the pre-existing muted state of the communication participant.

If, however, it is determined that the user is not muted at determination 208, flow instead branches "NO" to operation 212, where an action is performed to address the identified negative intent. In examples, the action is specifically associated with either audio input and/or video input of the communication session. For example, if it is determined that audio input exhibits a negative intent to interact with the communication session, operation 212 may comprise automatically enabling an audio mute. Similarly, video mute may be enabled for video input that is determined to exhibit a negative intent. As noted above, any of a variety of additional or alternative actions may be performed at operation 212, including, but not limited to, providing an indication of the determined intent to one or more other communication participants and/or providing a recommendation to the user of the computing device to enable mute, among other examples. Method 200 terminates at operation 212.

Returning to determination 206, if it is instead determined that the user intends to interact with the communication session (e.g., as a result of the interaction intent metric being above a positive intent threshold), flow branches "YES" to determination 214, where it is determined whether the user is muted. Aspects of determination 214 are similar to determination 208 and are therefore not necessarily re-described. Accordingly, if it is determined that the user is not muted, flow branches "NO" at terminates at operation 216. By contrast, if it is instead determined that the user is muted, flow branches "YES" to operation 218, where an action is performed to address the identified positive intent. In examples, the action is specifically associated with either audio input and/or video input of the communication session. For example, if it is determined that audio input exhibits a positive intent to interact with the communication session, operation 212 may comprise providing a reminder to disable an audio mute. Similarly, a suggestion to raise the user's hand may be presented for video input that is determined to exhibit a positive intent. As noted above, any of a variety of additional or alternative actions may be performed at operation 218, including, but not limited to, providing an indication of the determined intent to one or more other communication participants and/or providing a recommendation to respond using an alternative mode of communication (e.g., textual input), among other examples. In some instances, a user may provide an indication that mute should automatically be disabled when a positive intent to communicate is identified, as may be the case when a confidence generated at operation 204 is above a predetermined threshold. Method 200 terminates at operation 218.

Returning to determination 206, if it is determined that the interaction intent metric is indeterminate, flow branches "INDETERMINATE" and terminates at operation 220. Thus, it will be appreciated that any of a variety of actions may be taken to address instances where a positive intent is identified but a user is muted or, conversely, where a negative intent is identified but the user is not muted. Restated, determinations 214 and 208 each evaluate the mute status of a user to determine whether the mute status (e.g., of the communication participant during an ongoing communication session) "matches" or aligns with the determined user intent, such that an action may be performed accordingly when the mute status does not match the determined user intent.

Figure 3:
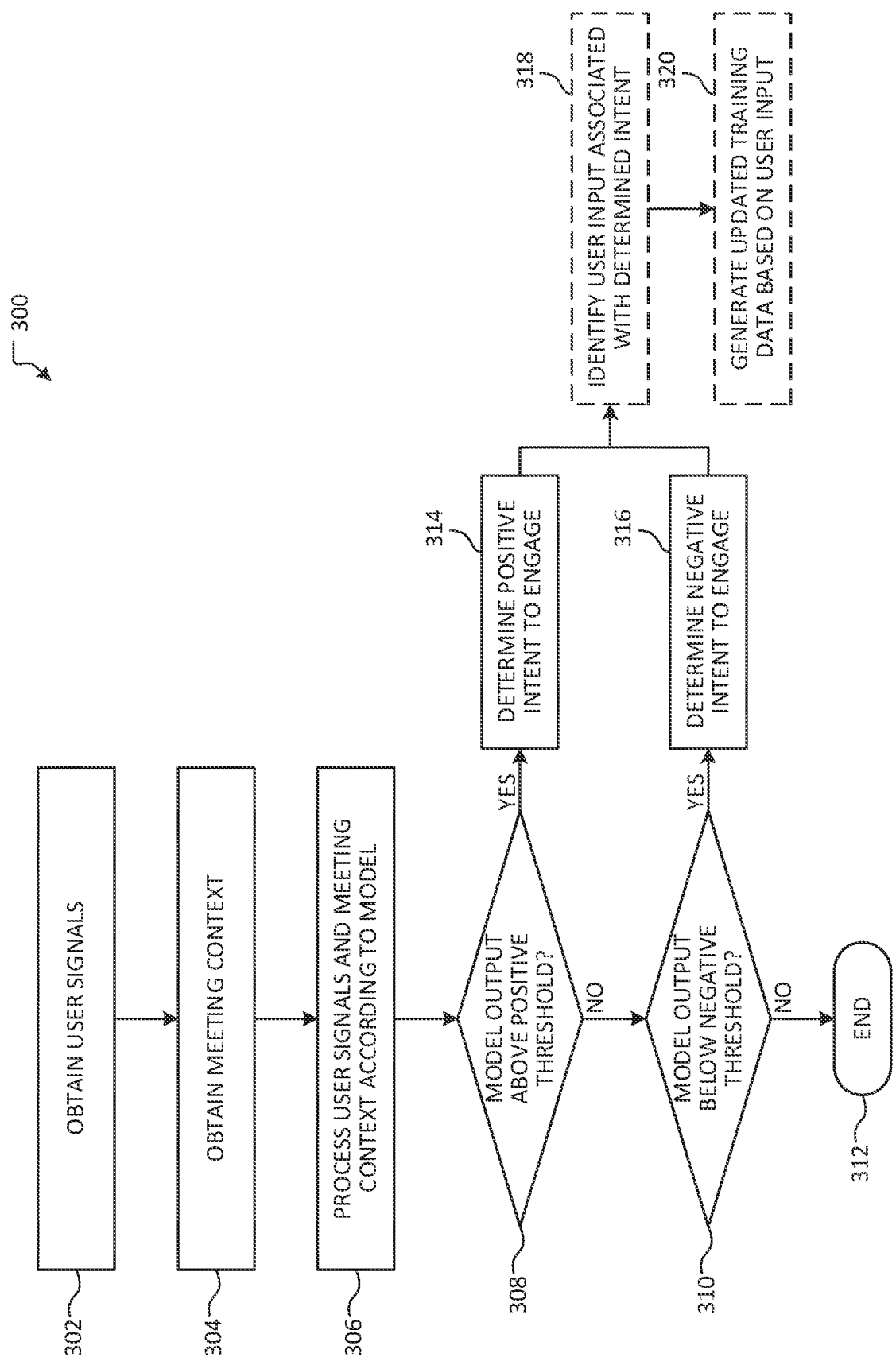
FIG. 3 illustrates an overview of an example method for generating an interaction intent metric for a user based on identified user input.

FIG. 3 illustrates an overview of an example method 300 for generating an interaction intent metric for a user based on identified user input. In examples, aspects of method 300 may be performed as part of operation 204 discussed above with respect to method 200 of FIG. 2. As another example, aspects of method 200 may be performed by a conferencing platform (e.g., conferencing platform 102 in FIG. 1) and/or by a computing device (e.g., computing devices 104 and/or 106).

Method 300 begins at operation 302, where user signals are obtained. For example, the user signals may be obtained from a user signal processor, such as user signal processor 118 or user signal processor 122 discussed above with respect to FIG. 1. The user signals may be associated with audio/video input associated with a user. In examples, the user signals may include historical user characteristics, among other examples.

At operation 304, a meeting context is obtained. For example, the meeting context may be obtained from a meeting signal processor, such as meeting signal processor 114 discussed above with respect to FIG. 1. In examples, the user signals obtained at operation 302 and the meeting signals obtained at operation 304 may each be generated local to the computing device that is performing method 300, remote from the computing device, or any combination thereof.

Flow progresses to operation 306, where the user signals and meeting context are processed according to a machine learning model. Operation 306 may include selecting the model from a set of models, as may be the case when a model is tuned for a specific context. Accordingly, an interaction intent metric is generated at operation 306. In some examples, a confidence score is generated in association with the interaction intent metric.

Flow progresses to determination 308, where it is determined whether the model output is above a positive intent threshold. As noted above, the positive intent threshold may be specific to a user or a group of users. In some examples, the positive intent threshold may be user-configurable. If it is determined that the model output is not above the positive intent threshold, flow branches "NO" to determination 310, where it is determined whether the model output is below a negative intent threshold. Similar to the positive intent threshold, the negative intent threshold may be specific to a user or a group of users. In some examples, the negative intent threshold may be user-configurable. If it is determined that the model output is not below the negative intent threshold, flow branches "NO" and terminates at operation 312.

Returning to determination 308, if it is determined that the model output is above the positive intent threshold, flow instead branches "YES" to operation 314, where a positive intent to engage with the communication session is determined. As a result, one or more actions may be performed depending on whether a user is muted, examples of which were discussed above with respect to method 200 in FIG. 2. In some examples, method 300 terminates at operation 314. In other examples, method 300 proceeds to operations 318 and/or operation 320, which are discussed in greater detail below.

Returning to determination 310, if it is determined that the model output is below the negative intent threshold, flow instead branches "YES" to operation 316, where a negative intent to engage with the communication session is determined. As a result, one or more actions may be performed depending on whether a user is muted, examples of which were discussed above with respect to method 200 in FIG. 2. In some examples, method 300 terminates at operation 316.

In other examples, method 300 proceeds to operations 318 and/or operation 320, which are each illustrated using a dashed box to indicate that they may be omitted in some examples. In an example, method 300 progresses from operation 314 or operation 316 to operation 318, where user input associated with the determined intent is identified. For example, the user input may be acceptance of a recommendation to enable or disable mute or may be dismissal of such a recommendation, among other examples.

Accordingly, at operation 320, updated training data may be generated as a result of the user input that was received at operation 318. For example, if it was determined that the user exhibited a positive intent to engage but the user input received at operation 318 was a dismissal of a suggestion to unmute the user's microphone, the updated training data may include a negative annotation of one or more factors that were obtained at operation 302 and/or operation 304. The updated training data may then be used to update or train a new a machine learning model (e.g., as may be applied at operation 306), thereby improving model performance for future processing according to aspects described herein. In examples, such reinforcement learning techniques may be applied at a user level (e.g., thereby yielding a model that is personalized for a given user or group of users) or for a population of users, among other examples. Example populations of users include, but are not limited to, a general population of users, a cohort of users in a similar job role, and/or a cohort of users in a similar meeting role (organizer, participant, etc.). Method 300 terminates at operation 320.

Figure 4:
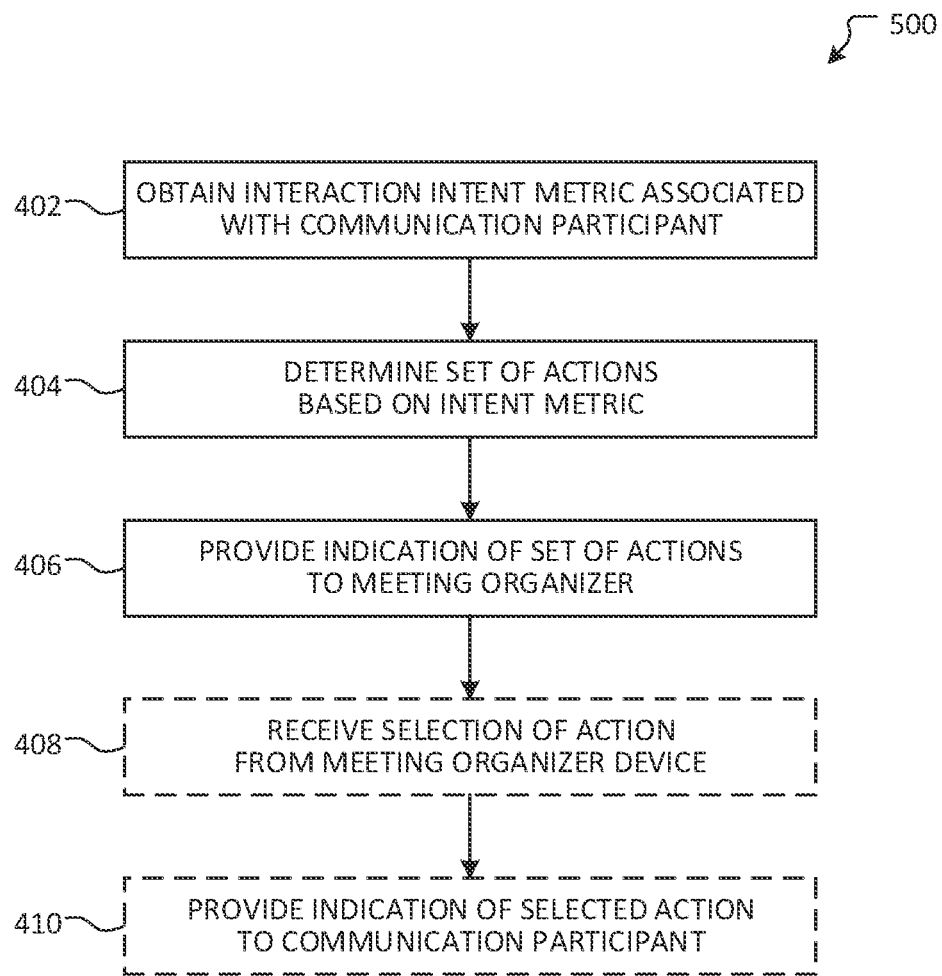
FIG. 4 illustrates an overview of an example method for generating and providing a set of actions for a communication participant with which to manage a communication session according to aspects described herein.

FIG. 4 illustrates an overview of an example method 400 for generating and providing a set of actions for a communication participant with which to manage a communication session according to aspects described herein. In examples, aspects of method 400 are performed by a conference manager, such as conference manager 110 discussed above with respect to conferencing platform 102 in FIG. 1. In other examples, similar aspects may be performed at a computing device of a communication participant. For example, similar aspects may be performed by communication application 116 or communication application 120 of computing device 104 or computing device 106, respectively.

Method 400 begins at operation 402, where an interaction intent metric associated with a communication participant is obtained. For example, the interaction intent metric may have been generated as a result of performing aspects of method 200 and/or method 300 discussed above with respect to FIGS. 2 and 3, respectively. For example, operation 402 may obtain a determination as a result of operation 314 or operation 316 of method 300.

At operation 404, a set of operations is determined based on the intent metric. In some examples, operation 404 comprises evaluating the intent metric and/or a meeting context to determine the set of actions, as the set of actions may change depending on the meeting context. In some instances, a confidence score associated with the intent metric may be evaluated at operation 404, as some actions may not be identified in instances when the confidence score is below a predetermined threshold. As an example, each action may have an associated interaction intent metric magnitude threshold and/or confidence score that may be used to determine whether the action is included in the determined set of actions. In some instances, a machine learning model may be used to determine the set of actions, as discussed above.

Flow progresses to operation 406, where an indication of the determined set of actions is provided to a meeting organizer. Thus, the meeting organizer may be able to perform an action in instances where an intent to engage with a communication session is identified but a user is muted or the user does not intend to engage but the user is unmuted. While method 400 is described in an example where the indication is provided to the meeting organizer, it will be appreciated that similar techniques may be used to provide such an indication to any of a variety of additional or alternative users. In examples, method 400 terminates at operation 406.

In some instances, method 400 continues to operation 408, where a selection of an action is received from a computing device of the meeting organizer. For example, the meeting organizer may select to mute a participant or may indicate that the communication participant will be able to communicate soon, among other examples. In some examples, method 400 terminates at operation 408.

In other examples, method 400 progresses to operation 410, where an indication of the selected action is provided to the communication participant. For example, the communication participant may receive an indication that the meeting organizer is aware of the user's attempted contribution and that the user has been added to a queue for future participation in the communication session. In other examples, operation 410 comprises performing the selected action, for example to mute the communication participant. Method 400 terminates at operation 410.

Figure 5:
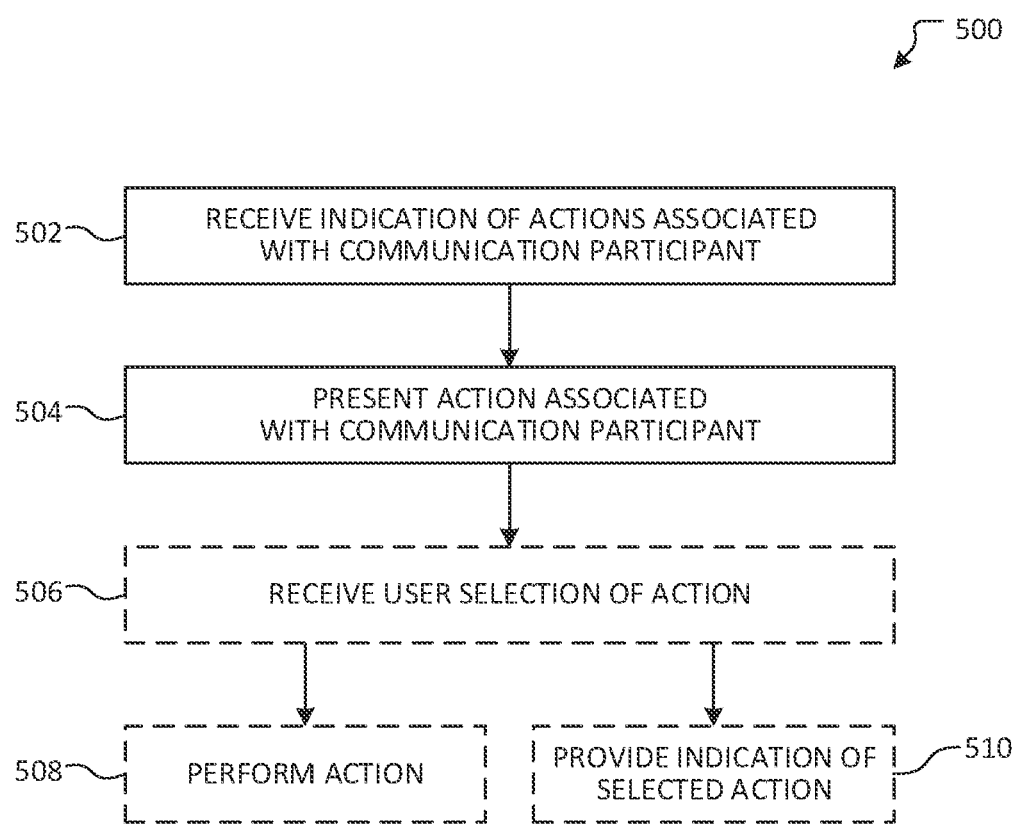
FIG. 5 illustrates an overview of an example method for managing a communication session based on user input received from a communication participant according to aspects described herein.

FIG. 5 illustrates an overview of an example method 500 for managing a communication session based on user input received from a communication participant according to aspects described herein. In examples, aspects of method 500 are performed by a computing device of a communication participant, such as computing device 104 or computing device 106 discussed above with respect to FIG. 1.

Method 500 begins at operation 502, where an indication of a set of actions associated with a communication participant is received. For example, the indication may have been generated as a result of performing aspects of method 400 discussed above with respect to FIG. 4. The actions may have been determined according to an interaction intent metric associated with the communication participant.

At operation 504, at least one action from the set of actions is presented to the user. For example, the action may be presented as part of a list of available actions or the action may be presented in association with a name and/or other information about the communication participant. In some instances, aspects of method 500 may be performed multiple times, as may be the case when multiple communication participants have been determined to exhibit an intent interaction metric that is either above a positive intent threshold or below a negative intent threshold, among other examples. In such instances, one or more actions may be presented for multiple communication participants at operation 504.

As discussed above, any of a variety of actions may be presented, including, but not limited to, an indication that the communication participant is attempting to engage in the communication session, a recommendation to mute a communication participant, a recommendation remind participants that they are currently on mute and may wish to unmute themselves to contribute, and/or an indication that a communication participant will be automatically muted after a predetermined period of time. In some instances, method 500 terminates at operation 504, as may be the case when a user selection is not received (e.g., at operation 506) and an action is not performed (e.g., at operation 508), such that the presented action(s) may be informational in nature.

In other examples, flow progresses to operation 506, where a user selection of an action is received. For example, the user may actuate a user interface control element associated with the action that was presented at operation 504. It will be appreciated that any of a variety of input techniques may be used, for example via one or more hardware buttons or using a voice user interface, among other examples.

Flow may progress to operation 508, such that the selected action is performed. For example, operation 508 may comprise causing a communication participant to be muted (e.g., as a result of providing an indication to a conferencing platform and/or to the computing device of the communication participant). In another example, operation 510 may be performed, such that an indication of the selected action is provided (e.g., such that it may be received at operation 408 of method 400 discussed above with respect to FIG. 4). It will be appreciated that operations 508 and 510 are not mutually exclusive, such that one or both operations may be performed in various examples. Method 500 terminates at operations 508 and/or 510.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 6:
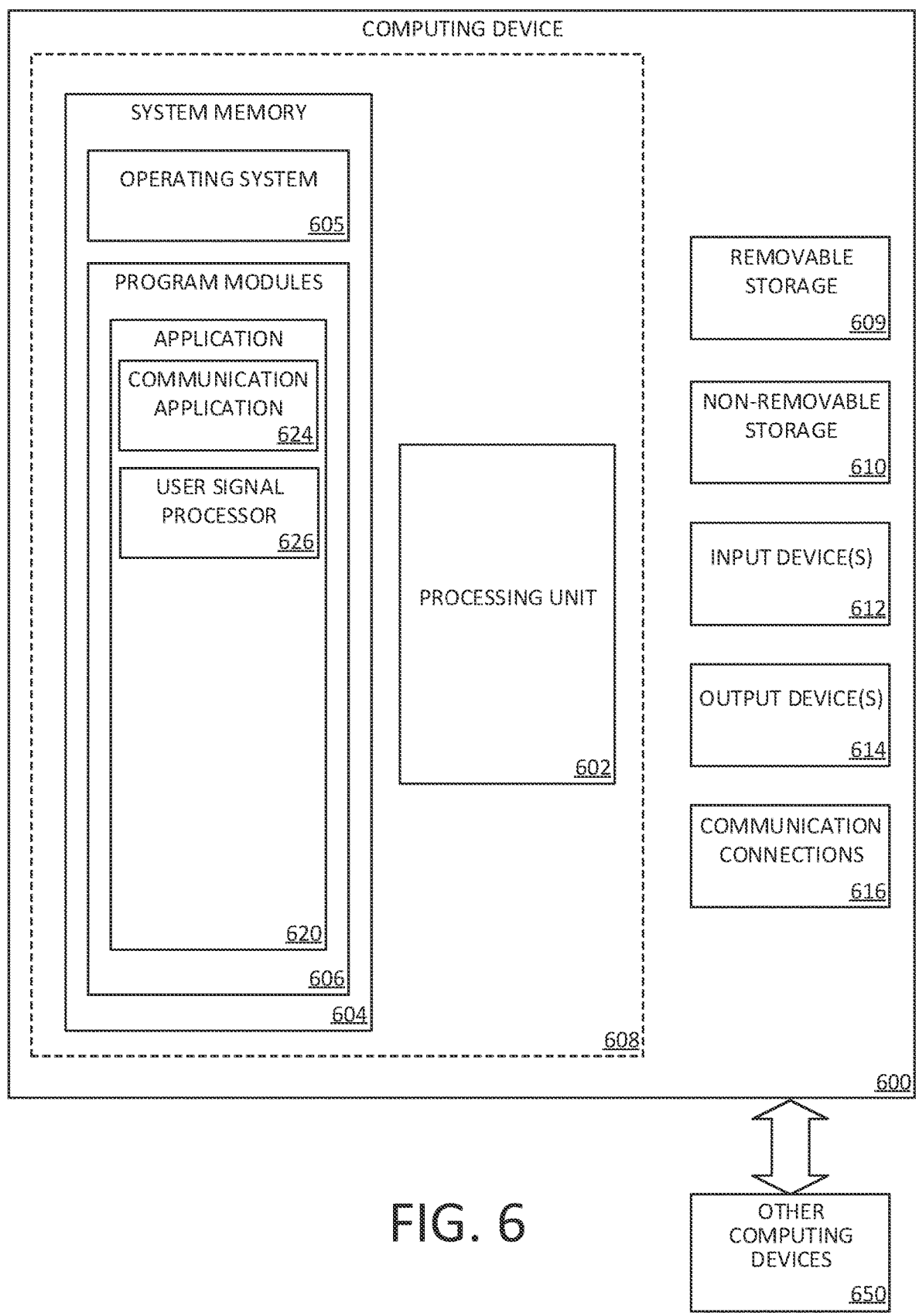
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above, including devices 104 and/or 106, as well as one or more devices associated with conferencing platform 102 discussed above with respect to FIG. 1. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may store communication application 624 and user signal processor 626. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
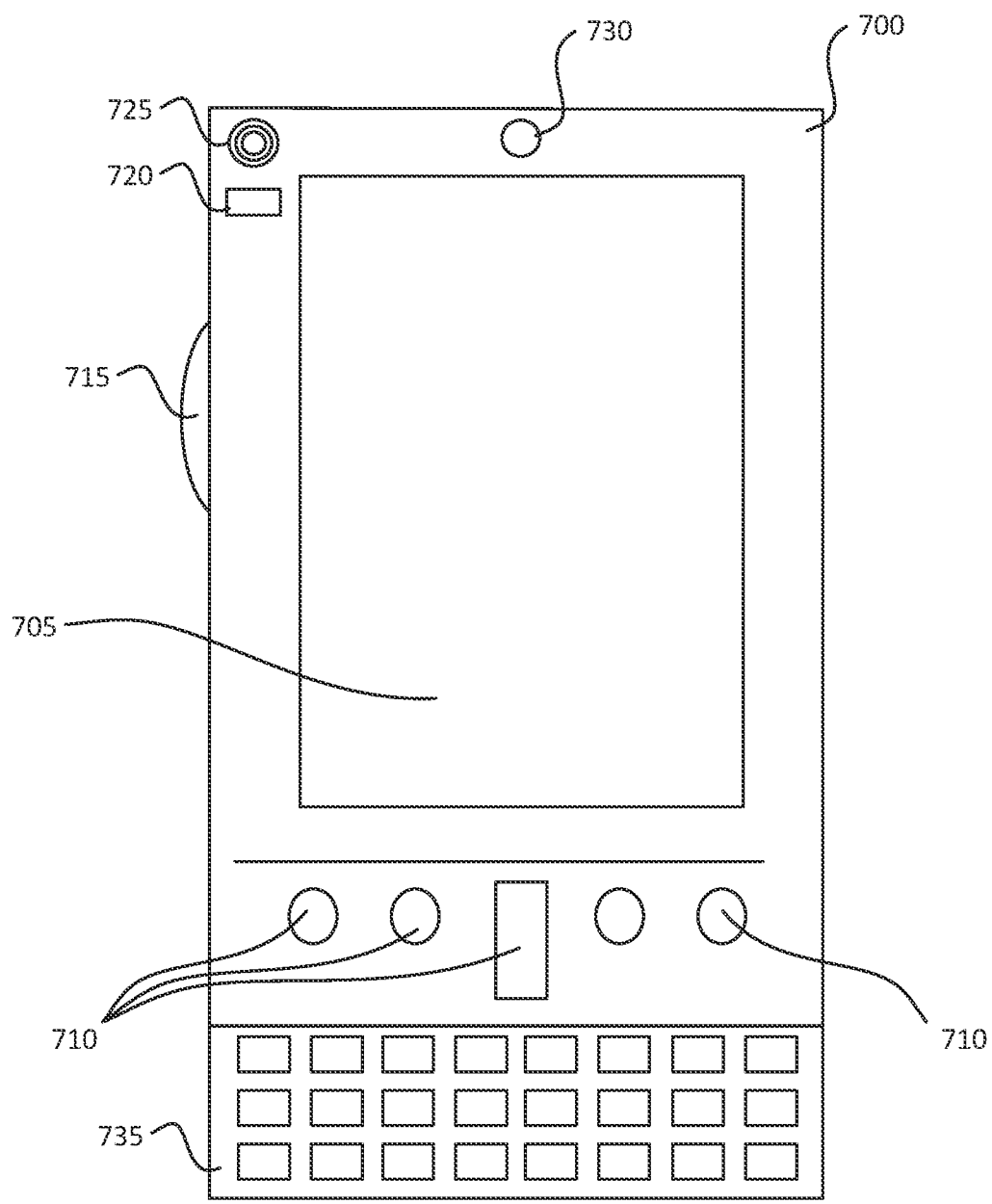
FIGS. 7A and 7B are simplified block diagrams of a mobile computing device with which aspects of the present disclosure may be practiced.
Figure 7B:
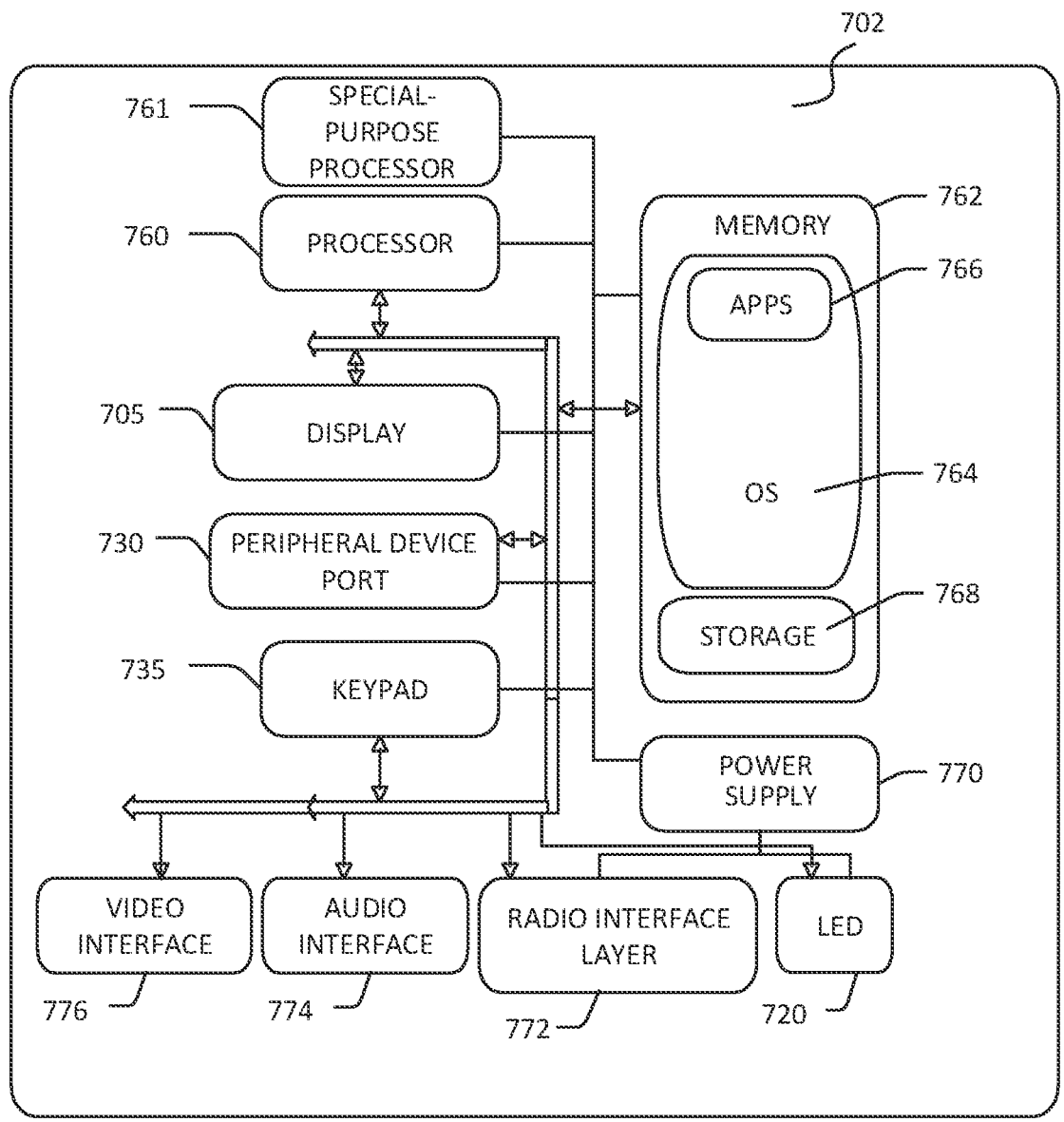

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments.

In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
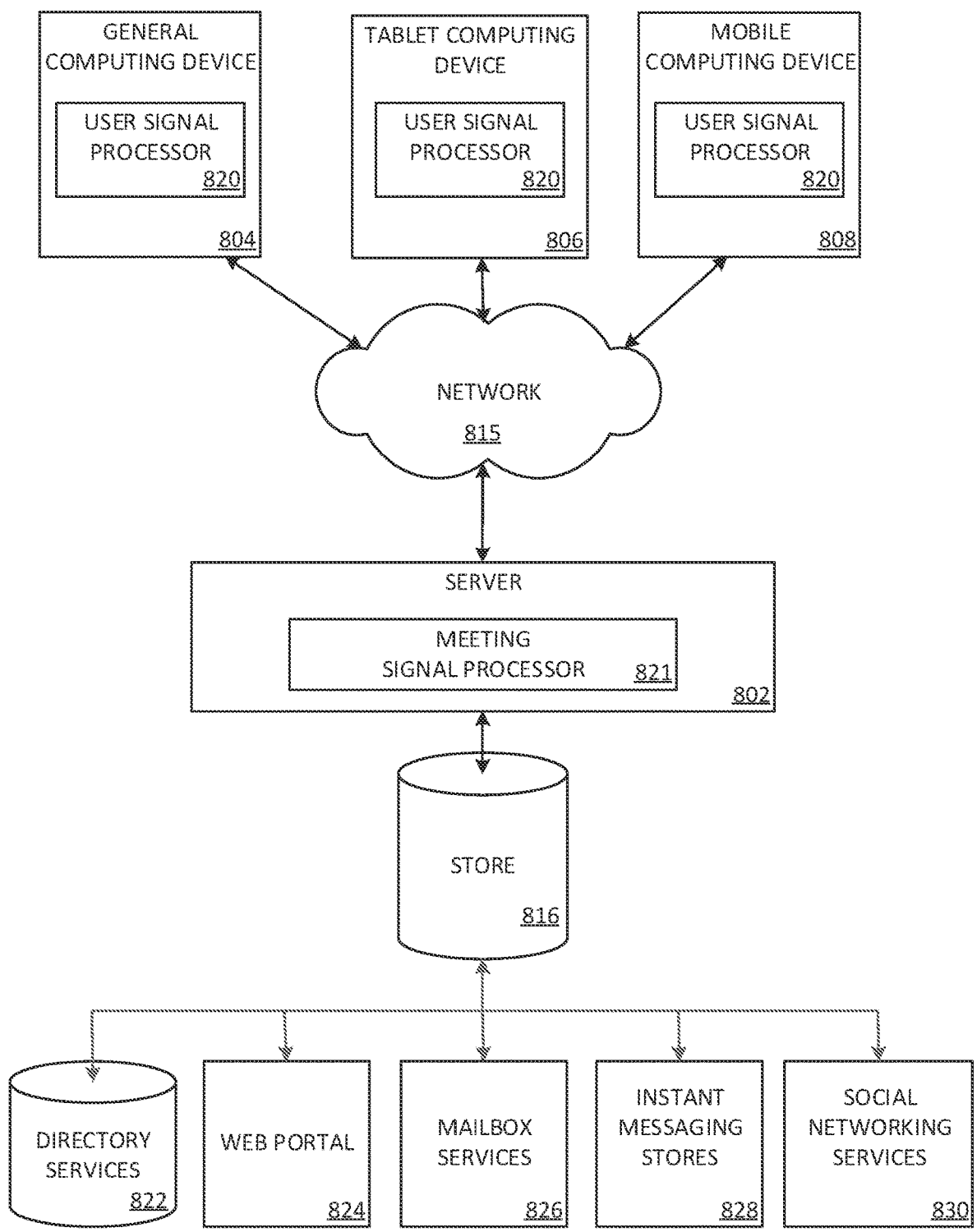
FIG. 8 is a simplified block diagram of a distributed computing system in which aspects of the present disclosure may be practiced.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

A user signal processor 820 may be employed by a client that communicates with server device 802, and/or meeting signal processor 821 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

Figure 9:
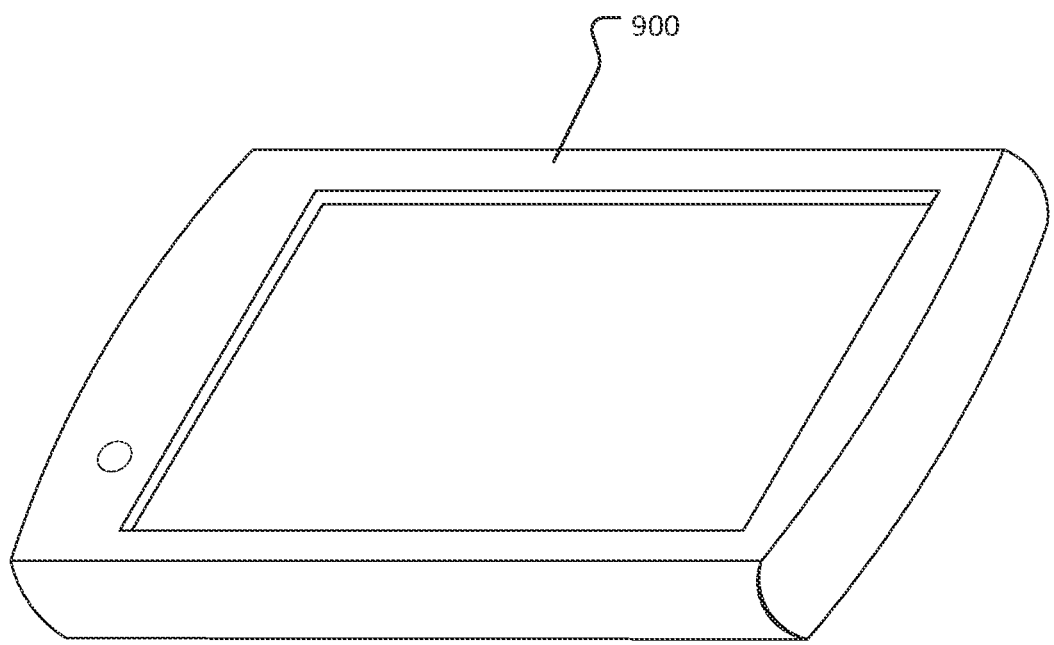
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: obtaining input associated with an environment of a computing device; generating, based on the input associated with the environment, an interaction intent metric for a user of the computing device, wherein the user is a communication participant of a communication session; when it is determined that the interaction intent metric exceeds a positive intent threshold and input for the communication session is muted: identifying a first set of actions associated with a positive intent to engage in the communication session; and performing an action of the identified first set of actions; and when it is determined that the interaction intent metric is below a negative intent threshold and input for the communication session is not muted: identifying a second set of actions associated with a negative intent to engage in the communication session; and performing an action of the identified second set of actions. In an example, performing an action includes: displaying at least a part of the identified first set of actions or the identified second set of actions for selection by the user. In another example, performing an action includes: providing, to another computing device associated with the communication session, an indication of at least a part of the identified first set of actions or the identified second set of actions for presentation to a user of the another computing device. In a further example, the first set of actions includes providing a recommendation to unmute input for the communication session; and the second set of actions includes automatically muting input for the communication session. In yet another example, the interaction intent metric is generated using a machine learning model trained to process a set of factors associated with the communication session; and the machine learning model was trained based at least in part on annotated training data associated with at least one of the user or a population of users. In a further still example, the first set of actions is identified based at least in part on at least one of the interaction intent metric or a confidence score associated with the interaction intent metric. In another example, the input includes at least one of: audio input from an audio device associated with the computing device; and video input from a video device associated with the computing device.

In another aspect, the technology relates to a method for managing a communication session. The method comprises: obtaining input associated with an environment of a computing device; generating, based on the input, an interaction intent metric for a communication participant of the communication session; evaluating the interaction intent metric using a threshold that is one of a negative intent threshold or a positive intent threshold; based on determining that the interaction intent metric exceeds the threshold, evaluating a mute status of the communication participant based on the interaction intent metric; and based on determining that the mute status of the communication participant does not match the interaction intent metric, performing an action associated with the mismatch between the mute status and the interaction intent metric. In an example, the action comprises: providing a recommendation to unmute input for the communication session when the interaction intent metric exceeds the positive intent threshold; or automatically muting the communication participant when the interaction intent metric exceeds the negative intent threshold. In another example, the action comprises: presenting, to the communication participant at the computing device, a first recommendation associated with the mismatch between the mute status and the interaction intent metric; and providing, to another computing device associated with the communication session, and indication of a second recommendation associated with the mismatch between the mute status and the interaction intent metric, wherein the first recommendation and the second recommendation are different. In a further example, the action comprises: providing, to another computing device associated with the communication session, an indication associated with the mismatch between the mute status of the communication participant and the interaction intent metric. In yet another example, the interaction intent metric is generated using a machine learning model trained to process a set of factors associated with the communication session; and the machine learning model was trained based at least in part on training data associated with at least one of the communication participant or a population of users. In a further still example, the set of factors includes: a semantic factor associated with audio input; a linguistic factor associated with audio input; a video input factor; a meeting context associated an ongoing communication session; and a historical user characteristic factor associated with a communication participant of the ongoing communication session.

In a further aspect, the technology relates to a method for managing a communication session. The method comprises: obtaining input associated with an environment of a computing device; generating, based on the input associated with the environment, an interaction intent metric for a user of the computing device, wherein the user is a communication participant of a communication session; when it is determined that the interaction intent metric is below a negative intent threshold and input for the communication session is not muted: identifying a set of actions associated with a negative intent to engage in the communication session; and performing an action of the identified set of actions. In an example, the interaction intent metric is a first interaction intent metric; the set of actions is a first set of actions; and the method further comprises: generating, based on subsequent input associated with the environment of the computing device, a second interaction intent metric for the user; and when it is determined that the second interaction intent metric exceeds a positive intent threshold and input for the communication session is muted: identifying a second set of actions associated with a positive intent to engage in the communication session; and performing an action of the identified second set of actions. In another example, the first set of actions includes automatically muting input for the communication session; and the second set of actions includes providing a recommendation to unmute input for the communication session. In a further example, performing the action includes: displaying at least a part of the identified set of actions for selection by the user. In yet another example, performing the action includes: providing, to another computing device associated with the communication session, an indication of at least a part of the identified set of actions for presentation to a user of the another computing device. In a further still example, the interaction intent metric is generated using a machine learning model trained to process a set of factors associated with the communication session; and the machine learning model was trained based at least in part on annotated training data associated with at least one of the user or a population of users. In another example, the set of actions is identified based at least in part on at least one of the interaction intent metric or a confidence score associated with the interaction intent metric.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processor; and
memory storing instructions that, when executed by the at least one processor, causes the system to perform a set of operations, the set of operations comprising:
receiving, by the system, an interaction intent metric for a user of a first computing device, wherein the user is a communication participant of a communication session;
when it is determined that the interaction intent metric exceeds a positive intent threshold and input for the communication session is muted:
identifying a first set of actions associated with a positive intent to engage in the communication session;
providing, an indication of the first set of actions to a second computing device of an organizer of the communication session, wherein the first set of actions comprises a list of actions associated with the participant;
receiving, from the second computing device, an indication of a selected action from the first set of actions; and
performing the action with respect to the first computing device of the participant;
when it is determined that the interaction intent metric is below a negative intent threshold and input for the communication session is not muted:
identifying a second set of actions associated with a negative intent to engage in the communication session;
providing, an indication of the second set of actions to the second computing device of the organizer of the communication session wherein the second set of actions comprises a list of actions associated with the participant;
receiving, from the second computing device, an indication of a selected action from the second set of actions; and
performing the action with respect to the first computing device of the participant.

2. The system of claim 1, wherein performing an action includes:
displaying at least a part of the identified first set of actions or the identified second set of actions for selection by the user.

3. The system of claim 1, wherein performing an action includes:
providing, to another computing device associated with the communication session, an indication of at least a part of the identified first set of actions or the identified second set of actions for presentation to a user of the another computing device.

4. The system of claim 1, wherein:
the first set of actions includes providing a recommendation to unmute input for the communication session; and
the second set of actions includes automatically muting input for the communication session.

5. The system of claim 1, wherein:
the interaction intent metric is generated using a machine learning model trained to process a set of factors associated with the communication session; and
the machine learning model was trained based at least in part on annotated training data associated with at least one of the user or a population of users.

6. The system of claim 1, wherein the first set of actions is identified based at least in part on at least one of the interaction intent metric or a confidence score associated with the interaction intent metric.

7. The system of claim 1, wherein the input includes at least one of:
audio input from an audio device associated with the computing device; and
video input from a video device associated with the computing device.

8. A method for managing a communication session, the method comprising:
receiving, by a computing device; an interaction intent metric for a communication participant of a first computing device;
evaluating, by the computing device, the interaction intent metric using a threshold that is one of a negative intent threshold or a positive intent threshold;
based on determining that the interaction intent metric exceeds the threshold, evaluating a mute status of the communication participant based on the interaction intent metric;
providing, an indication of the first set of actions to a second computing device of an organizer of the communication session, wherein the first set of actions comprises a list of actions associated with the communication participant;
receiving, from the second computing device, an indication of a selected action from the first set of actions; and
performing the action with respect to the first computing device of the communication participant;
based on determining that the mute status of the communication participant does not match the interaction intent metric, performing, at the first computing device, an action associated with the mismatch between the mute status and the interaction intent metric;
providing, an indication of the second set of actions to the second computing device of the organizer of the communication session, wherein the second set of actions comprises a list of actions associated with the communication participant;
receiving, from the second computing device, an indication of a selected action from the second set of actions; and
performing the action with respect to the first computing device of the communication participant.

9. The method of claim 8, wherein the action comprises:
providing a recommendation to unmute input for the communication session when the interaction intent metric exceeds the positive intent threshold; or
automatically muting the communication participant when the interaction intent metric exceeds the negative intent threshold.

10. The method of claim 8, wherein the action comprises:
presenting, to the communication participant at the computing device, a first recommendation associated with the mismatch between the mute status and the interaction intent metric; and
providing, to another computing device associated with the communication session, and indication of a second recommendation associated with the mismatch between the mute status and the interaction intent metric, wherein the first recommendation and the second recommendation are different.

11. The method of claim 8, wherein the action comprises:
providing, to another computing device associated with the communication session, an indication associated with the mismatch between the mute status of the communication participant and the interaction intent metric.

12. The method of claim 8, wherein:
the interaction intent metric is generated using a machine learning model trained to process a set of factors associated with the communication session; and
the machine learning model was trained based at least in part on training data associated with at least one of the communication participant or a population of users.

13. The method of claim 12, wherein the set of factors includes:
a semantic factor associated with audio input;
a linguistic factor associated with audio input;
a video input factor;
a meeting context associated an ongoing communication session; and
a historical user characteristic factor associated with a communication participant of the ongoing communication session.

14. A method for managing a communication session, the method comprising:
receiving, by the system, an interaction intent metric for a user of a first computing device, wherein the user is a communication participant of a communication session;
when it is determined that the interaction intent metric is below a negative intent threshold and input for the communication session is not muted:
identifying a set of actions associated with a negative intent to engage in the communication session; and
providing, an indication of the first set of actions to a second computing device of an organizer of the communication session, wherein the first set of actions comprises a list of actions associated with the participant;
receiving, from the second computing device, an indication of a selected action from the first set of actions; and
performing the action with respect to the first computing device of the participant.

15. The method of claim 14, wherein:
the interaction intent metric is a first interaction intent metric;
the set or actions is a first set or actions; and the method further comprises:
- generating, based on subsequent input associated with the environment of the computing device, a second interaction intent metric for the user; and
- when it is determined that the second interaction intent metric exceeds a positive intent threshold and input for the communication session is muted:
  - identifying a second set of actions associated with a positive intent to engage in the communication session; and
  - performing an action of the identified second set of actions.

16. The method of claim 15, wherein:
the first set of actions includes automatically muting input for the communication session; and
the second set of actions includes providing a recommendation to unmute input for the communication session.

17. The method of claim 14, wherein performing the action includes:
displaying at least a part of the identified set of actions for selection by the user.

18. The method of claim 14, performing the action includes:
providing, to another computing device associated with the communication session, an indication of at least a part of the identified set of actions for presentation to a user of the another computing device.

19. The method of claim 14, wherein:
the interaction intent metric is generated using a machine learning model trained to process a set of factors associated with the communication session; and
the machine learning model was trained based at least in part on annotated training data associated with at least one of the user or a population of users.

20. The method of claim 14, wherein the set of actions is identified based at least in part on at least one of the interaction intent metric or a confidence score associated with the interaction intent metric.

* * * * *